(12) United States Patent
Hunt

(10) Patent No.: US 8,963,847 B2
(45) Date of Patent: Feb. 24, 2015

(54) USER INTERFACE FOR A REMOTE CONTROL DEVICE

(75) Inventor: Neil D. Hunt, Los Altos, CA (US)

(73) Assignee: Netflix, Inc., Los Gatos, CA (US)

( * ) Notice: Subject to any disclaimer, the term of this patent is extended or adjusted under 35 U.S.C. 154(b) by 158 days.

(21) Appl. No.: 12/961,387

(22) Filed: Dec. 6, 2010

(65) Prior Publication Data

US 2012/0139847 A1    Jun. 7, 2012

(51) Int. Cl.
*G06F 3/048*    (2013.01)
*G06F 3/0346*   (2013.01)
*G06F 3/0488*   (2013.01)
*H04N 21/422*   (2011.01)

(52) U.S. Cl.
CPC .......... *G06F 3/0346* (2013.01); *G06F 3/04883* (2013.01); *H04N 21/42224* (2013.01); *H04N 21/42207* (2013.01)
USPC ........................................................ 345/173

(58) Field of Classification Search
CPC ............ G06F 3/048–3/04812; G06F 3/04817; G06F 3/0482; G06F 3/0488
USPC ............ 345/156, 173–184; 455/418–420, 92, 455/151.1–153.2, 352–355; 348/14.05, 348/114, 734; 715/704
See application file for complete search history.

(56) References Cited

U.S. PATENT DOCUMENTS

| 5,545,857 | A * | 8/1996 | Lee et al. ................... 178/18.03 |
| 5,682,326 | A | 10/1997 | Klingler et al. |
| 6,262,724 | B1 | 7/2001 | Crow et al. |
| 6,330,592 | B1 | 12/2001 | Makuch et al. |
| 6,765,557 | B1 | 7/2004 | Segal et al. |
| 7,053,965 | B1 | 5/2006 | Fan |
| 2002/0097229 | A1 | 7/2002 | Rose et al. |
| 2003/0071855 | A1 * | 4/2003 | Kim .............................. 345/810 |
| 2003/0169234 | A1 | 9/2003 | Kempisty |
| 2004/0255328 | A1 * | 12/2004 | Baldwin et al. ................. 725/90 |

(Continued)

FOREIGN PATENT DOCUMENTS

JP    H05-333839 A    12/1993
JP    H08-065539 A    3/1996

(Continued)

OTHER PUBLICATIONS

International search report for application No. PCT/US2011/063583 dated Mar. 28, 2012.

(Continued)

*Primary Examiner* — Liliana Cerullo
(74) *Attorney, Agent, or Firm* — Patterson & Sheridan, LLP

(57) ABSTRACT

One embodiment of the present invention sets forth a technique for controlling the operations of a consumer electronic (CE) device. A system includes a display device, CE device, and a remote controller with a touchpad. The CE device is configured to output a context-specific user interface for display by the display device. The particular user interface varies based on the operational context of the CE device. The remote controller sends signals that are detected by the CE device and control operations performed by the CE device. More specifically, the remote controller is used as a handheld pointing device to select operations through interactions with the context-specific user interface. A user may apply gestures to the touchpad that are interpreted based on the context-specific user interface to control the CE device.

15 Claims, 9 Drawing Sheets

(56) References Cited

U.S. PATENT DOCUMENTS

| | | |
|---|---|---|
| 2005/0017890 A1 | 1/2005 | Nam et al. |
| 2005/0188406 A1 | 8/2005 | Gielow et al. |
| 2006/0026535 A1* | 2/2006 | Hotelling et al. ............ 715/863 |
| 2007/0124780 A1* | 5/2007 | Lee ................................ 725/89 |
| 2008/0072175 A1 | 3/2008 | Corbett et al. |
| 2008/0122796 A1* | 5/2008 | Jobs et al. .................... 345/173 |
| 2008/0253735 A1 | 10/2008 | Kuspa et al. |
| 2008/0302582 A1 | 12/2008 | Sekhri et al. |
| 2009/0153288 A1* | 6/2009 | Hope et al. ..................... 340/3.1 |
| 2009/0290849 A1* | 11/2009 | Ohtake et al. .................. 386/68 |
| 2010/0107107 A1 | 4/2010 | Corbett et al. |
| 2010/0241699 A1 | 9/2010 | Muthukumarasamy et al. |
| 2012/0127072 A1* | 5/2012 | Kim .............................. 345/156 |

FOREIGN PATENT DOCUMENTS

| | | |
|---|---|---|
| JP | H09-305305 A | 11/1997 |
| JP | 2001-306620 A | 11/2001 |
| JP | 2003-527805 A | 9/2003 |
| JP | 2004-199696 A | 7/2004 |
| JP | 2005-101994 A | 4/2005 |
| JP | 2006-094210 A | 4/2006 |
| JP | 2006-195970 A | 7/2006 |
| JP | 2007-048383 A | 2/2007 |
| JP | 2012-521585 A | 9/2012 |
| WO | 2005/022944 A1 | 3/2005 |

OTHER PUBLICATIONS

U.S. Appl. No. 11/683,858 entitled User Interface and Pointing Device for a Consumer Electronics Device, filed Mar. 8, 2007.

* cited by examiner

USER INTERFACE FOR A REMOTE CONTROL DEVICE

BACKGROUND OF THE INVENTION

1. Field of Invention

This disclosure generally relates to a displayed user interface for consumer electronic devices, and more specifically to activating the user interface using a remote controller including a touchpad.

2. Description of Related Art

There are numerous websites that contain media content, e.g., video, imagery, audio, video conferencing, and the like. The media content ranges from major news, sports, movie and entertainment sites, to home video clips, personal photo collections, and the full range of sites between. In general, with such websites, a mouse-like pointing device is used to interact with the media content, and the content is viewed on a display coupled to a personal computer.

Recently, consumer electronic devices have started to be configured as connected media devices, e.g., connected Blu-Ray players, media adaptors, connected televisions, digital video recorders, and cable boxes. In contrast with the personal computing devices that use a mouse-like pointing device to interact with the content, when interacting with content via these consumer electronic devices, a handheld remote control device is typically used that can navigate a displayed menu in a limited number of directions such as left, right, up, and down. Consequently, media content developed for viewing on a personal computer may not be easily viewed via a consumer electronic device because the media content may not be able to be navigated easily or at all with a handheld remote control device. Furthermore, the typical handheld remote control device includes numerous buttons to control the different operations that can be performed by the consumer electronic device. In order to press a particular button, a user may need to read a label on the button or the buttons may require backlighting that consumes more power. Overall, the typical handheld remote control is less intuitive and more cumbersome than a typical mouse-like pointing device.

As the foregoing illustrates, what is needed in the art is a device that can be used to more intuitively control how content is viewed when interacting with the content via a consumer electronic device. Additionally, it is desirable to produce a low cost pointer device that can control a consumer electronic device.

SUMMARY OF THE INVENTION

One embodiment of the present invention sets forth a technique for controlling the operations of a consumer electronic (CE) device through an intuitive context-specific user interface and moveable cursor. A system includes a display device, CE device, and a remote controller with a touchpad. The CE device is configured to output a context-specific user interface for display by the display device. The particular user interface varies based on the operational context of the CE device. The remote controller sends signals that are detected by the CE device and control operations performed by the CE device. More specifically, the remote controller is used as a handheld pointing device to position the movable cursor and select operations through interactions with the context-specific user interface. A user may apply gestures to the touchpad that are interpreted based on the context-specific user interface to control the CE device.

One embodiment of the invention provides a computer-implemented method for controlling a consumer electronic device. The method includes receiving a signal from a remote controller that is configured to control the consumer electronic device, where the signal is generated in response to a user gesture that is applied to a touchpad of the remote controller. An operational context is determined based on a function being performed by the consumer electronic device. In response to the signal received from the remote controller, a context-specific user interface based on the operational context is output for display to a display device associated with the consumer electronic device. Also in response to the signal received from the remote controller, a cursor and having a position that is controlled by the signal received from the remote controller is output for display and overlaid on the context-specific user interface.

Compared with conventional multi-button remote controllers, a remote controller including a touchpad provides an inexpensive solution for controlling a CE device through interaction with a context-specific user interface displayed on an existing display on or attached to a the CE device. The context-specific user interface simplifies the user interaction for controlling the CE device since the user interface includes only controls that are relevant for the current operations for the CE device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
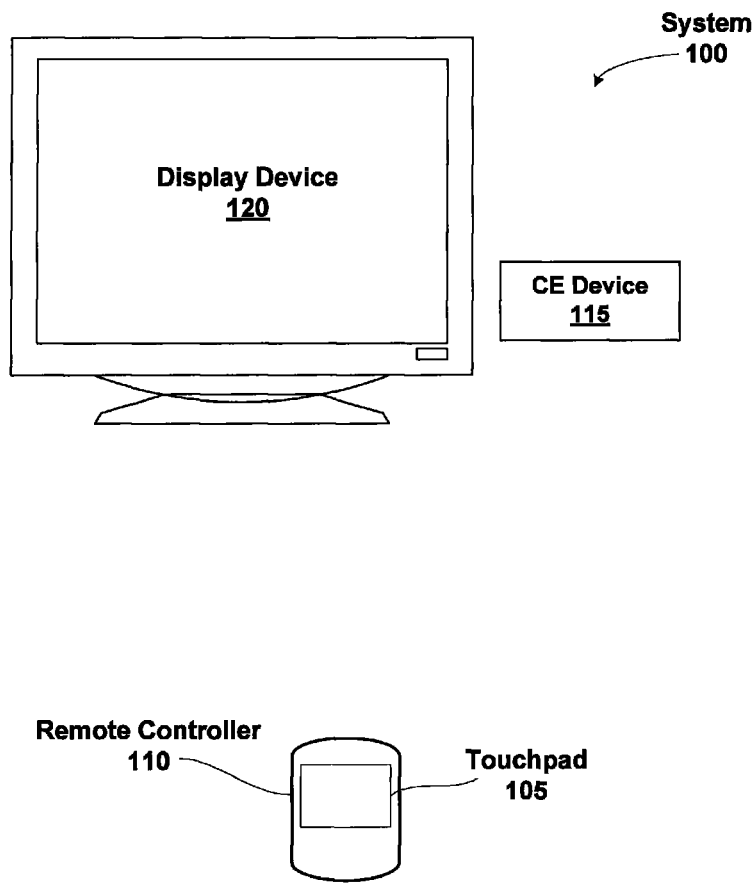
FIG. 1 illustrates a system configured to implement one or more aspects of the present invention.

FIG. 1 illustrates a system 100 that is configured to implement one or more aspects of the present invention. The system 100 includes a display device 120, consumer electronic (CE) device 115, and a remote controller 110 with a touchpad 105. The remote controller 110 may communicate with the CE device 115 through an infra-red optical technology or a radio-frequency wireless link based upon Bluetooth, WiFi, Z-wave, or other low-power digital wireless connection. The connection may be uni-directional (from the remote controller 110 to the CE device 115) or bi-directional. The touchpad 105 of the remote controller 110 may be a touch-sensitive input device using a capacitive or similar technology to detect gestures, e.g., tap, swipe, and the like, applied by a user. The remote controller 110 may be packaged in a housing appropriate for a hand-held device, e.g., a package 15 cms long, 5-10 cms wide, and 1 cm thick.

The remote controller 110 is configured to control the CE device 115, e.g., television, DVD player, set-top box, and other media device that includes an integrated display or is coupled to the display device 120. The display device 120 may be a conventional CRT, LCD based monitor, projection screen, a combination of a projector and screen, or the like. In one embodiment, the CE device 115 may comprise a set-top box configured to receive streaming audiovisual media, to convert the media to one or more output signals in a specified audiovisual format, and to provide the one or more output signals to the display device 120. In another embodiment, the client computer 110 may comprise a digital disc media player, such as a Blu-ray player, configured to receive streaming audiovisual media, to convert the media to one or more output signals in a specified audiovisual format, and to provide the one or more output signals to the display device 120. In another embodiment, the CE device 115 may comprise a personal computer, laptop computer, notebook computer, or handheld computer. Embodiments also encompass a computer program product that can be loaded into a computer to perform the functions that are described herein. Thus, an embodiment may comprise a computer-readable storage medium storing one or more sequences of instructions which, when executed by one or more digital processors, cause the processors to perform steps as shown and described.

The consumer electronic device 115 is configured to output a context-specific user interface for display on the display device 120. The particular user interface varies based on the operational context of the CE device 120, where the operational context is the function being performed by the CE device 120 at the particular moment in time. For example, the operational context of the CE device 120 varies when a DVD is inserted into the CE device 120 compared with when the content of the DVD is playing. The operational context of the CE device 120 is different when the CE device 120 is configured to provide a video conferencing function compared with when the CE device 120 is configured as a game box. Additionally, the context-specific user interface may include selection controls, e.g., a pull-down menu or radio buttons, for selecting a particular station or playlist based on the operational context of the CE device 120 when the CE device 120 is configured to provide an audio media playback function. Other context-specific user interfaces may provide an on-screen keyboard to allow a user to enter specific words, channels, call letters, and the like, based on other operational contexts of the CE device 120.

The remote controller 110 sends signals that are detected by the CE device 115 and control operations performed by the CE device 115. More specifically, the remote controller 110 is used as a handheld pointing device to select operations through interactions with the context-specific user interface. A user may apply gestures to the touchpad 105 that are interpreted by the CE device 115 based on the context-specific user interface to control the CE device 115. Importantly, the user interface is displayed on the display device 120 and not on the remote controller 110. Therefore, no display of status information is necessary on the remote controller 115. In one embodiment, the remote controller 110 includes only the touchpad 105 and no buttons or other mechanism for receiving user-provided input.

Since the context-specific user interface and associated feedback is provided at the display device 120, the remote controller 110 may consume very little power, and may be powered by a two or three AA or AAA sized batteries. In one embodiment, the remote controller 110 includes a status display that is configured to highlight different control-sets on the touchpad 105 with selective backlighting.

The context-specific user interface that is displayed by display device 120 simplifies the user interaction compared with controlling the CE device 115 through a conventional multi-button remote control device. In particular, only controls that are relevant to the operations that may be performed by the user are included in the context-specific user interface. For example, when the CE device 115 is configured to display web pages on the display device 120 and perform web page operations, a context-specific user interface for navigating web pages may be displayed. The remote controller 110 controls the position of a cursor that is overlaid on the context-specific user interface and is used to select various operations or actions to be performed by the CE device 1'15 through the context-specific user interface.

When the CE device 115 is configured for playback of digital audio and video and video content a context-specific user interface that includes transport controls, e.g., Play, Stop, Pause, FF, RW, Next, Prev, and the like. A context-specific user interface may also include mode-sensitive controls, e.g., player setup controls, eject, power, and the like. Since the context-specific user interface is displayed on display device 120, no additional illumination is needed in the room or on the remote controller 110, such as backlighting. Therefore, the remote controller 110 may be operated without additional lighting and does not require any physical buttons for providing input commands to the CE device 115.

When the user activates the remote controller 110 a signal is transmitted to CE device 115. The signal may be transmitted in response to a motion sensor when the user picks up the remote controller 110 and when the user touches or strokes the touchpad 105. The CE device 115 overlays a movable cursor, and a context-specific user interface including graphical representations of mode-appropriate controls. The user interface may appear on the screen—fading in, sliding in from an edge, or otherwise appearing perhaps overlaid on the video or imagery or other content on the display device 120. Using a thumb or finger, the user strokes or swipes the touchpad 105 with directional gestures that cause the cursor to move on the display device 120. Clickable controls included in the context-specific user interface may be highlighted as the cursor passes over the controls. In contrast, most conventional remote control devices are limited to cursor movement in only the left, right, up, and down directions. Therefore, the user interaction with an associated menu is limited to those cursor movements. Also, a conventional remote control device typically has several buttons that control the cursor movement and other operations. Only a subset of the buttons may be relevant for a particular operational mode of the CE device 115. Finding the correct buttons to activate on a conventional remote control device can be challenging for a user, particularly when the lighting level is low and labels on the buttons cannot be easily seen.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

System Overview

Figure 2:
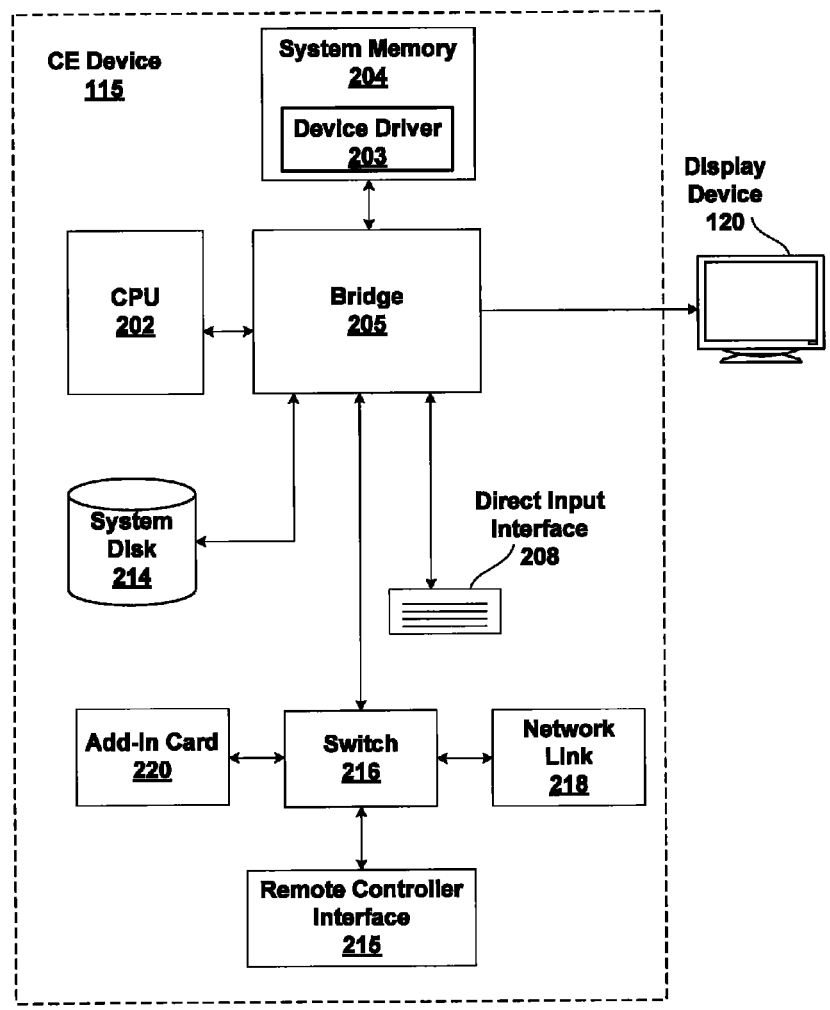
FIG. 2 is a block diagram illustrating the consumer electronic device and display device of FIG. 1, according to one embodiment of the present invention.

FIG. 2 is a block diagram illustrating the CE device 115 and display device 120 of FIG. 1, according to one embodiment of the present invention. The CE device 115 includes a central processing unit (CPU) 202 and a system memory 204 communicating via an interconnection path that may include a bridge 205. CPU 202 may be, for example, a general purpose microprocessor and the system memory 204 may be a random access memory (RAM) or other dynamic storage device for storing information and instructions to be executed by CPU 202. System memory 204 also may be used for storing temporary variables or other intermediate information during execution of instructions to be executed by CPU 202. Such instructions, when stored in storage media accessible to CPU 202, render CE device 115 into a special-purpose machine that is customized to perform the operations specified in the instructions.

A device driver 203 may be stored in the system memory 204 and configured to translate signals received from the remote controller 110 into commands for the CE device 115. A system disk 214, such as a magnetic disk or optical disk, is provided and coupled to a bridge 205 for storing information and instructions.

CE device 115 may be coupled via a bus to a display device 120 and the bridge 205 may receive user input from one or more user input devices (e.g., keyboard, physical buttons, mouse, or trackball) via a direct input interface 208. The bridge 205 forwards the user input to CPU 102 and provides pixels for display to the display device 120.

CE device 115 may implement the techniques described herein using customized hard-wired logic, one or more ASICs or FPGAs, firmware and/or program logic which in combination with the computer system causes or programs CE device 115 to be a special-purpose machine. According to one embodiment, the techniques herein are performed by CE device 115 in response to CPU 202 executing one or more sequences of one or more instructions contained in system memory 204. Such instructions may be read into system memory 204 from another storage medium, such as system disk 214. Execution of the sequences of instructions contained in system memory 204 causes CPU 202 to perform the process steps described herein. In alternative embodiments, hard-wired circuitry may be used in place of or in combination with software instructions.

The term "computer-readable storage media" as used herein refers to any media that store data and/or instructions that cause a machine to operation in a specific fashion. Such storage media may comprise non-volatile media and/or volatile media. Non-volatile media includes, for example, optical or magnetic disks, such as system disk 214. Volatile media includes dynamic memory, such as system memory 204. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that couple components to the bridge 205 and a switch 216. Transmission media can also take the form of acoustic or light waves, such as those generated during radio-wave and infra-red data communications.

The switch 216 provides connections between bridge 205 and other components such as a network link 118 and various add-in cards, such as add-in card 220. Other components (not explicitly shown), including USB or other port connections, CD drives, DVD drives, film recording devices, and the like, may also be connected to the bridge 205. A remote-controller interface 215 that is coupled to the switch 216 may include an infra-red detector that can receive the data carried in an infra-red signal output by the remote controller 110 and provide the signal to the CPU 202 and/or the device driver 203.

The switch 216 also provides a two-way data communication coupling to a network link 218 that is connected to a local network. For example, the network link 218 may include a local area network (LAN) card to provide a data communication connection to a compatible LAN. Wireless links may also be implemented. In any such implementation, network link 218 sends and receives electrical, electromagnetic or optical signals that carry digital data streams representing various types of information.

Network link 218 typically provides data communication through one or more networks to other data devices. For example, network link 218 may provide a connection through a local network to a host computer or to data equipment operated by an Internet Service Provider (ISP). An ISP in turn provides data communication services through the world wide packet data communication network now commonly referred to as the "Internet." A local network and Internet both use electrical, electromagnetic or optical signals that carry digital data streams. The signals through the various networks and the signals on network link 218 and through switch 216, which carry the digital data to and from CE device 115, are example forms of transmission media.

CE device 115 can send messages and receive data, including digital audio and video data and program code, through the network(s) and network link 218. The received code may be executed by CPU 202 as it is received, and/or stored in system disk 214, or other non-volatile storage for later execution. The received digital audio and video data may be displayed by display device 120 under the control of the CPU 202.

It will be appreciated that the system shown herein is illustrative and that variations and modifications are possible. The connection topology, including the number and arrangement of bridges, the number of CPUs 202, and the number of display devices 120, may be modified as desired. For instance, in some embodiments, system memory 204 is connected to CPU 202 directly rather than through a bridge, and other devices communicate with system memory 204 via CPU 202. The particular components shown herein are optional; for instance, any number of add-in cards or peripheral devices might be supported. In some embodiments, switch 216 is eliminated, and network link 218, remote controller interface 215, and add-in card 120 connect directly to bridge 205.

Figure 3:
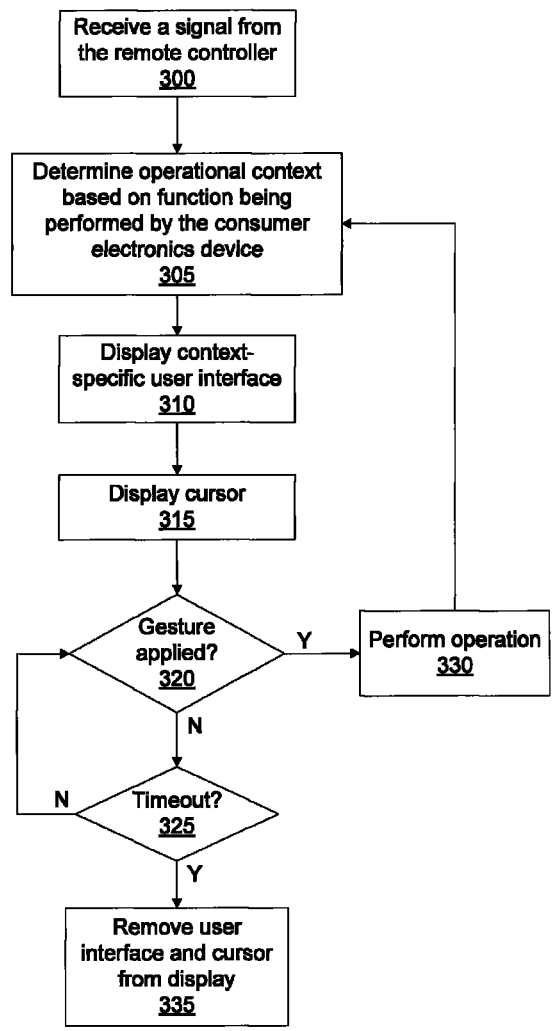
FIG. 3 sets forth a flow diagram of method steps for controlling the consumer electronic device, according to one embodiment of the present invention.

FIG. 3 sets forth a flow diagram of method steps for controlling the CE device 115, according to one embodiment of the present invention. Although the method steps are described in conjunction with the systems for FIGS. 1 and 2, persons skilled in the art will understand that any system configured to perform the method steps, in any order, is within the scope of the invention.

The method begins at step 300, where the CE device 115 receives a signal from the remote controller 110 that is configured to control the CE device 115. The signal is generated in response to a user gesture that is applied to the touchpad 105 of the remote controller 110. At step 305 the CE device 115 determines an operational context based on a function being performed by the CE device 115. The operational context may depend on the content displayed on the display device 120. For example when a user views a webpage with a video or the CE device 115 is playing a video, the operational context is video playback. When a DVD is inserted into the CE device 115 the operational context is the DVD controls.

At step 310, in response to the signal received from the remote controller 110, the CE device 115 outputs a context-specific user interface based on the operational context to the display device 120. Also in response to the signal received from the remote controller 110, at step 315 the CE device 115 outputs a cursor at a position that is controlled by the signal from the remote controller. The user interface is displayed by the display device 120 and the cursor is overlaid on the user interface at the position.

At step 320 the CE device 115 determines if the signal indicates that a gesture was applied to the touchpad 105 of the remote controller 110 by a user, and, if not, at step 325 the CE device 115 determines if a timeout has expired. A timeout counter is used to determine when display of the user interface and/or cursor should be discontinued due to inactivity. A short duration of time, e.g., 500 mS, 2 seconds, between gestures or movement of the remote controller 115 may be cause the timeout counter to expire. If, at step 325, the timeout has not expired, then the CE device 115 returns to step 320. Otherwise, at step 335 the timeout has expired and the context-specific user interface and cursor are removed from the display device 120. The context-specific user interface and cursor may fade out, slide off the screen, or otherwise disappear.

If, at step 320 the CE device 115 determines that the signal indicates that a gesture was applied to the touchpad 105 of the remote controller 110 by a user, then at step 330 the CE device 115 performs the operation specified by the gesture. Examples of gestures include a single tap, double or multiple tap, and a directional swipe or stroke on the touchpad 105. The cursor position on the display device 120 is updated based on the directional gestures.

Figure 4A:
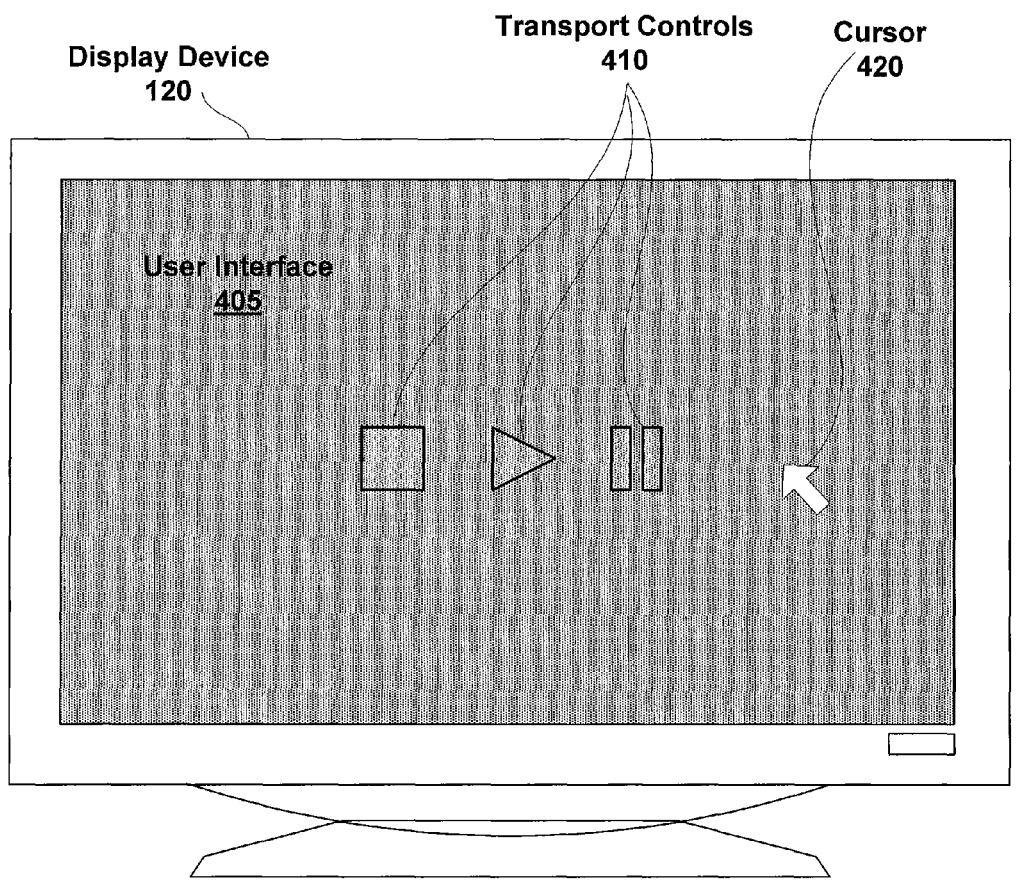
FIGS. 4A, 4B, 4C, 4D, and 4E illustrate context-specific user interfaces, according to one embodiment of the present invention.

FIG. 4A illustrates a context-specific user interface 405 that is displayed by the display device 120, according to one embodiment of the present invention. When the operational context of the CE device 115 is playback of a DVD, the context-specific user interface 405 may include graphical elements for transport controls, e.g., Play, Stop, Pause, FF (fast forward), RW (rewind), Next, Prev (previous), and DVD Menu buttons. In one embodiment, a gesture such as a double-tap anywhere in the context-specific user interface 455 may activate the play function and a triple-tap may activate the fast-forward function. The graphical elements for Stop, Play, and Pause transport controls 410 are shown in FIG. 4A. The cursor 420 is overlaid on the context-specific user interface 405 at a position that is controlled by the remote controller 110.

Figure 4B:
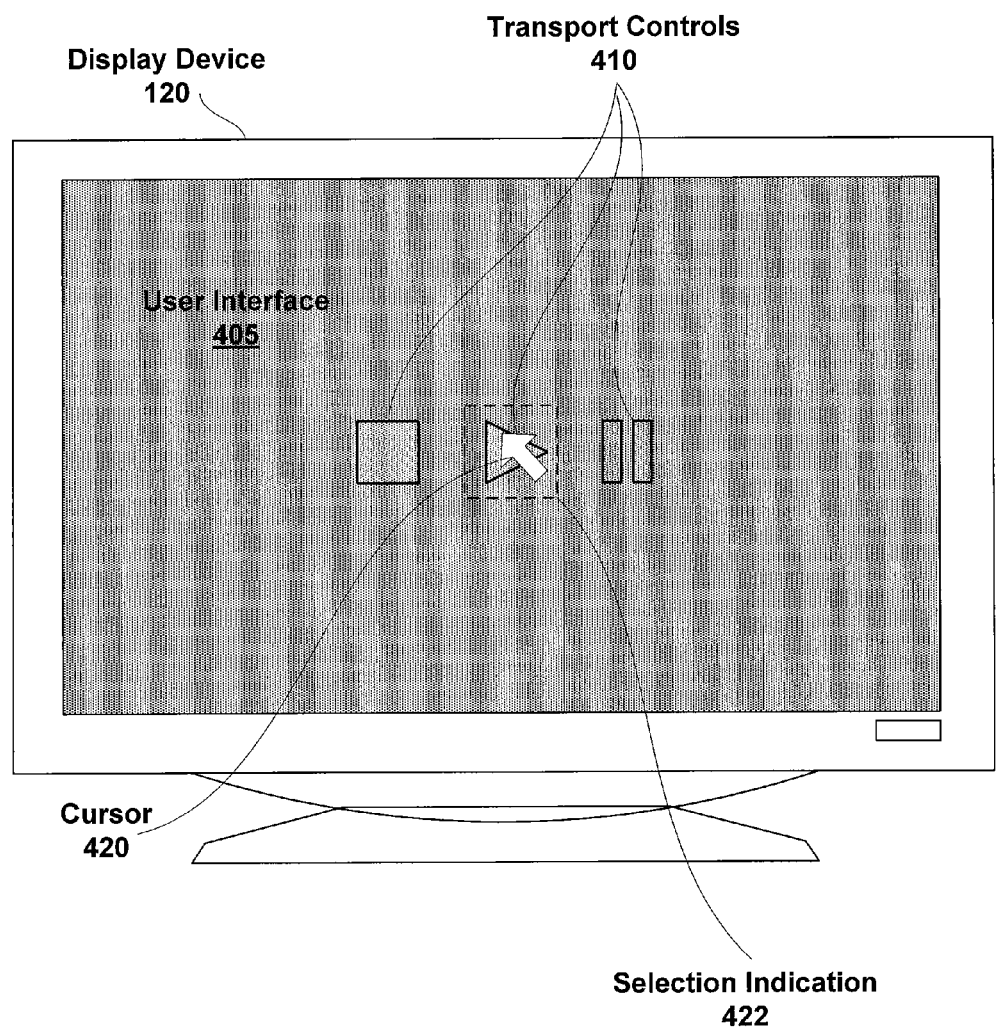

FIG. 4B illustrates a context-specific user interface 405 that is displayed by the display device 120, according to one embodiment of the present invention. Clickable controls may be highlighted as the cursor passes over the graphical elements for the control, as shown in FIG. 4B by a selection indication 422 when the cursor 420 is positioned over the graphical element for the Play control. Importantly, since the graphics elements for controls are depicted on the display device 120, operation in a dark room requires no recall of the layout of specific buttons on the remote controller 115. The graphics elements for controls are visible on the display device 120, and relative motion gestures are applied to the touchpad 105 to control the CE device 115.

Figure 4C:
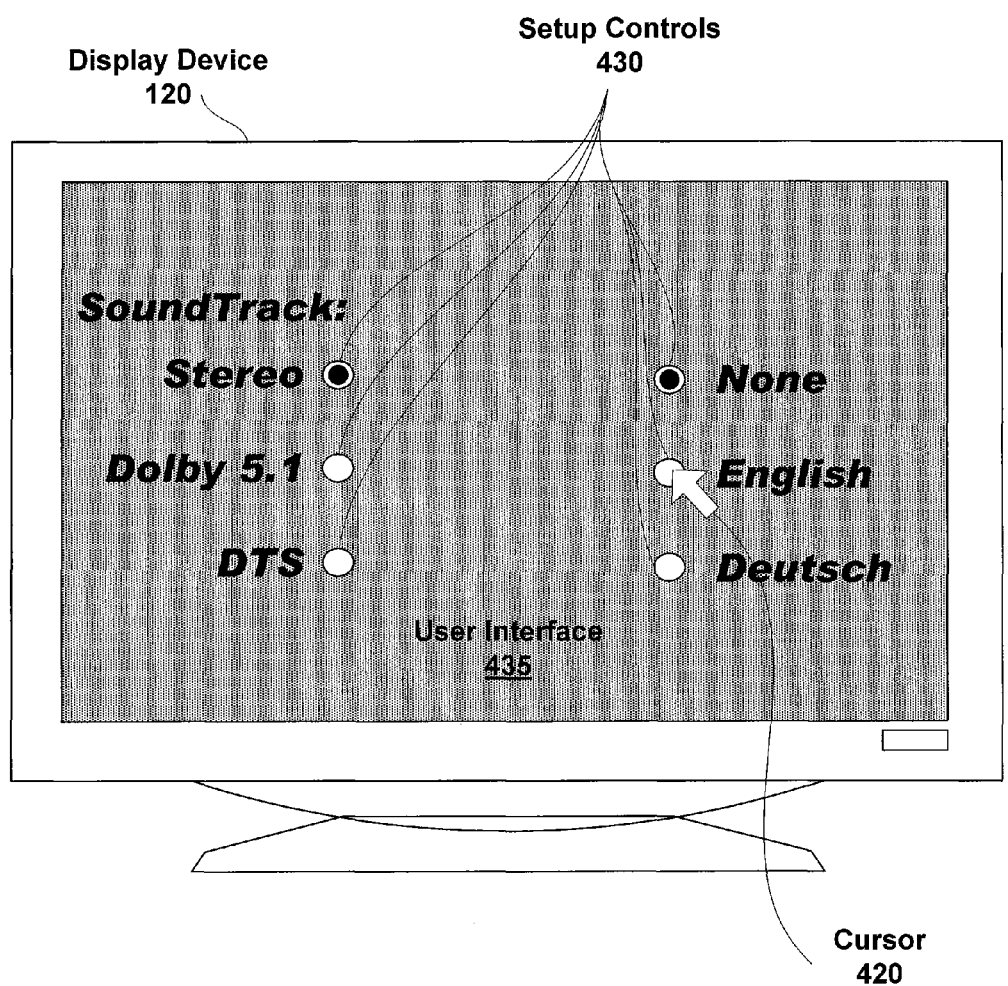

FIG. 4C illustrates a context-specific user interface 435 that is displayed by the display device 120, according to one embodiment of the present invention. When the operational context of the CE device 115 is an idle DVD either after playback is concluded or when a DVD is inserted, the context-specific user interface may include graphical elements for the player setup controls, the eject control, and the power-control. As shown in FIG. 4C, the user interface 435 includes setup controls 430 for selecting various soundtrack options. Functions, such as choosing a soundtrack or subtitle overlay, may be difficult to locate by navigating system submenus of conventional CE devices. Alternatively, these functions may be selected by toggling a special button on a conventional remote control device (one of dozens of special-purpose buttons). A user may easily access these functions using the remote controller 110 since the functions can be exposed much more directly by a context-specific user interface that includes the setup controls 430 as on-screen choices overlaying the media content.

Figure 4D:
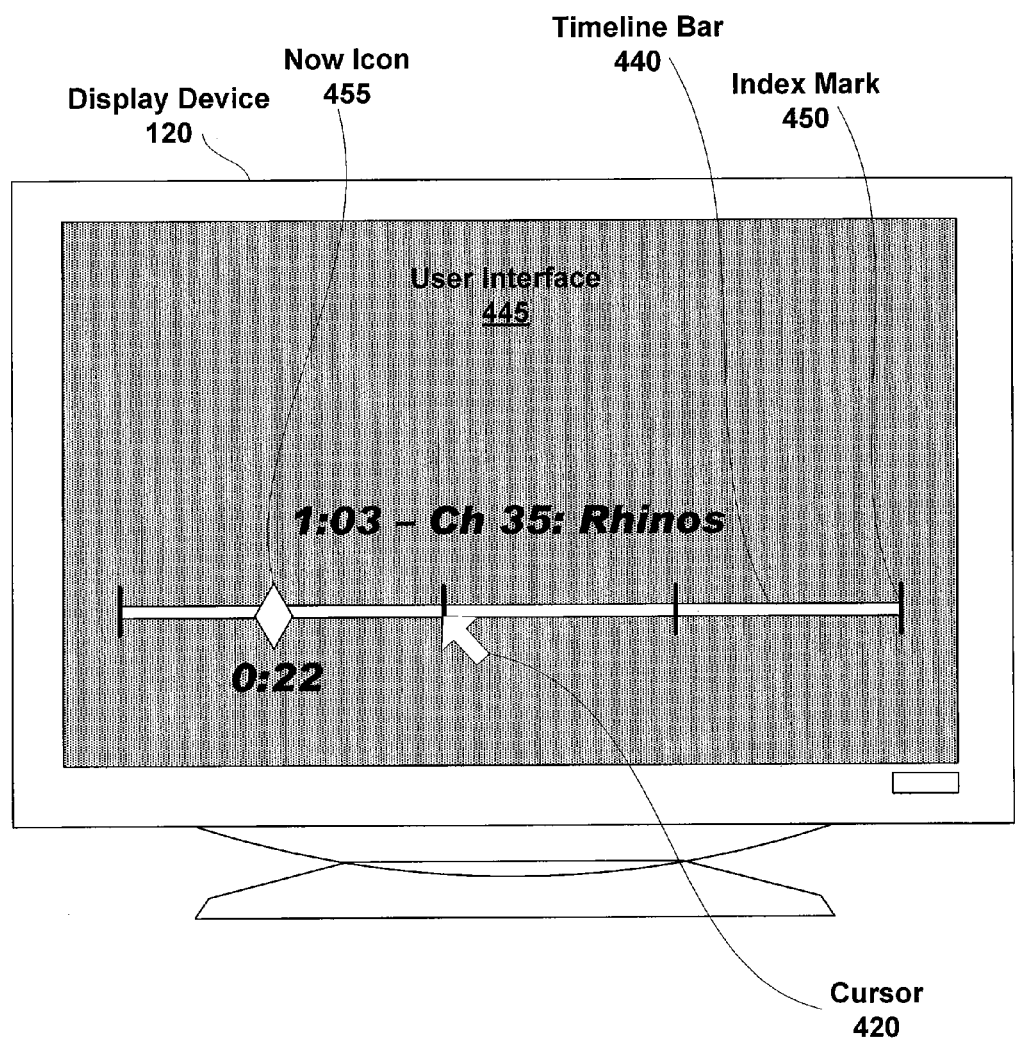

FIG. 4D illustrates a context-specific user interface 445 that is displayed by the display device 120, according to one embodiment of the present invention. When the operational context of the CE device 115 is playback digital video and audio content, an alternative to including transport controls (Play, Stop, Pause, FF, RW, Next, Prev) in the context-specific user interface 445 is to include graphical elements for a timeline bar 440 on the display device 120, with a "now" icon 455 representing the current display point. A user may directly drag (via the cursor 420) the now icon 455 along the timeline bar 440 to move to a different position along the timeline bar 440. A gesture such as a double-tap anywhere in the context-specific user interface 455 may activate the play function and a triple-tap may activate the fast-forward function.

Chapter or index marks, such as index mark 450 may be displayed on the timeline bar 440 to represent likely points in time to skip forward to or to rewind to. Gestures applied by a user to the touchpad 105, such as dragging forward or backward along the timeline bar 440 may be modified near index marks so that the index marks exert "gravity" or "magnetism." The gravity or magnetism attracts the now icon 455 to snap the now icon 455 to an index mark when the now icon 455 is moved near to the index mark. Additionally, commercial content may be highlighted or otherwise distinguished graphically on the timeline bar 440 in order to allow the user to navigate past or to the commercial content.

Figure 4E:
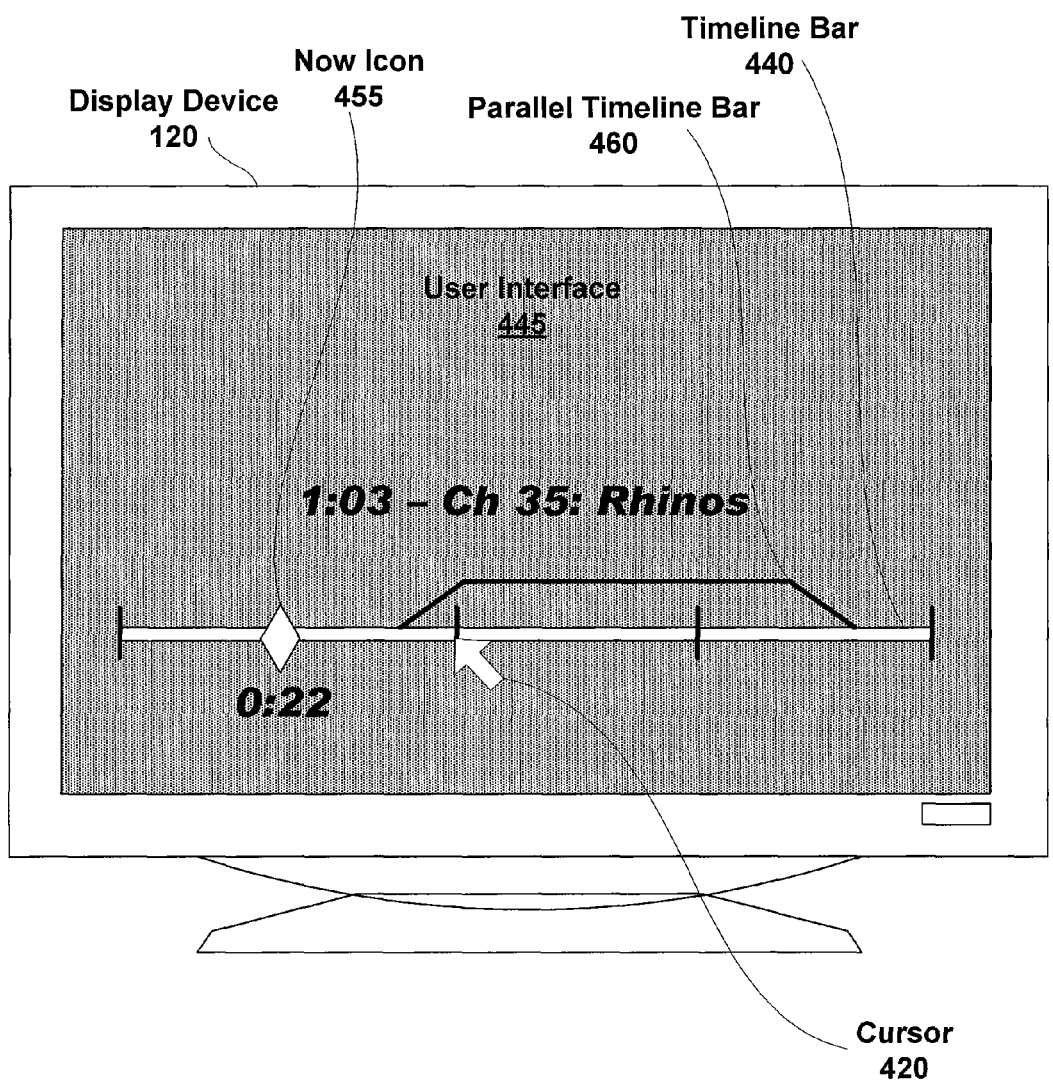

FIG. 4E illustrates the context-specific user interface 445 including a parallel timeline bar, according to one embodiment of the present invention. Alternative angle scenes or variations may be displayed in the user interface 445 as parallel timeline bars to the timeline bar 440. A parallel timeline bar 460 branches and rejoins the timeline bar 440 to represent a time region for which different angle scenes of the digital video and audio content are available. The parallel timeline bar 460 may include content such as alternative endings, or even director's and actors' commentary soundtracks.

By way of example, imagine a DVD with a director's commentary, 10 minutes of alternative angle shots of a key scene, and a different ending. A user may touch the touchpad 105 to display the timeline bar 440 corresponding to the currently playing version of the movie. The parallel timeline bar 460 above the parallel timeline bar 440 may represent the program with director's commentary. Clicking on the timeline bar 460 controls the CE device 110 to output the director's commentary version of the digital video and audio content for display on the display device 120. Two seconds before up to ten seconds after the beginning of a section of the timeline bar 440 with an alternative scene angle, the parallel timeline bar 460 may fade in automatically, showing the parallel timeline bar 460 branching off the primary timeline bar 440. Clicking on the parallel timeline bar 460 may select an alternative scene angle and control the CE device 110 to output the alternative scene angle of the digital video and audio content for display on the display device 120. Clicking back on the primary timeline bar 440 controls the CE device 110 to output the primary scene angle of the digital video and audio content for display on the display device 120. Similarly, at any point along the primary timeline bar 440 where an alternative ending is possible, a parallel timeline bar may fade into the context-specific user interface 445 so that the user can select the alternative ending for display.

Figure 5:
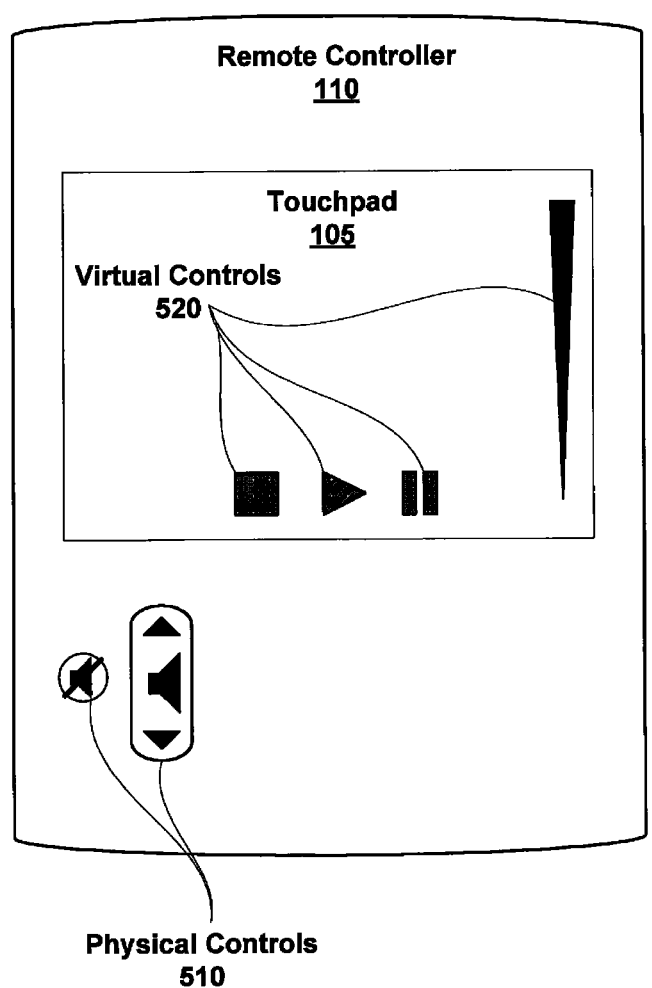
FIG. 5 illustrates the remote controller of FIG. 1, according to one embodiment of the present invention.

FIG. 5 illustrates the remote controller 110 of FIG. 1, according to one embodiment of the present invention. Some hard buttons, such as physical controls 510 may included in the remote controller 110 in addition to the touchpad 105. For example, commonly used buttons such as Volume Up/Down and Mute are included as physical controls 510 and are easy to feel in the dark. By using the physical controls 510, a user avoids having a context-specific user interface displayed that may obscure the content displayed on the display device 120.

Specific zones on the touchpad 105 may serve as dedicated buttons, shown as virtual controls 520. The virtual controls 520 may be identified by texture imprinted on the touchpad 105, printing (silkscreen, offset, etc.) on the touchpad 105, or selective backlighting. A user may stroke up or down along the right edge or other designated zone of the touchpad 105 to manage volume, e.g., upward strokes increase volume and downward strokes decrease volume. In one embodiment, a small wheel or roller on the side or top of the remote control 110 is used to manage volume and control the timeline bar.

The remote controller 110 may also be configured to emit sound to indicate an error, such as when a user attempts to manipulate a control that is inappropriate for the current operational context, e.g., attempting to select "Play" when a video is already playing. Sounds may also be used for aural feedback of clicking or dragging gestures, or to indicate when the movable cursor is positioned to select a graphic element for a control.

One advantage of the disclosed technique is that the context-specific user interface includes the controls that are relevant to the operational context of the CE device 115. Using a pointer device, such as the cursor that is controlled by user gestures provides an intuitive mechanism for controlling the CE device 115. The remote controller 110 is very simple and can be easily operated in the dark or with no additional lighting. Also, the remote controller 110 is "always on" and does not need to be "woken up" or enabled by entering a password or other operation to "power up" the device.

Another advantage of a pointing interface, such as that provided by a cursor having a position controlled by the remote controller 110, is the ability to navigate a dense, rich set of options and alternatives, in a manner similar to a website. Imagine 100,000 movie titles available to play on a streaming Internet movie player. The ability to move the cursor in any direction by applying a gesture to the touchpad 115 provides the user with an intuitive interface to browse, choose, select categories, pick and choose rich meta-content. Content developed for viewing on a personal computer and navigation using a pointer device may be viewed on the CE device 115 and navigated using the context-specific user interface and remote controller 110.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

I claim:

1. A computer-implemented method for controlling a consumer electronic device, the method comprising:
   receiving a first touchpad gesture from a remote controller that is configured to control the consumer electronic device;
   determining whether a video presentation being outputted for display by the consumer electronic device is in an idle state or a playback state;
   in response to the first touchpad gesture:
      outputting for display a first user interface when the video presentation is in the idle state; and
      outputting for display a second user interface when the video presentation is in the playback state,
      wherein the first user interface includes cursor-selectable graphic elements for setup controls for the consumer electronic device, and the second user interface includes cursor-selectable graphic elements for transport controls for playback of the video presentation;
   outputting for display a cursor overlaid on the first user interface or the second user interface and having a position that is controllable by the remote controller; and
   executing a command associated with a cursor-selectable graphic element included in the first user interface or the second user interface based on the position of the cursor;
   wherein the cursor-selectable graphic elements for setup controls are overlaid on the video presentation when the video presentation is in the idle state, and the cursor-selectable graphic elements for transport controls are overlaid on the video presentation when the video presentation is in the playback state.

2. The method of claim 1, wherein the remote controller controls playback of the video presentation by specifying the position of the cursor at a timepoint along a timeline bar.

3. The method of claim 1, further comprising the steps of:
determining that an inactivity timer has expired; and
discontinuing outputting the cursor and the first user interface or the second user interface for display.

4. The method of claim 1, wherein the cursor-selectable graphic elements include navigation controls for digital content stored on the consumer electronic device or through a network coupled to the consumer electronic device.

5. The method of claim 1, wherein the cursor-selectable graphic elements include selection controls for digital content stored on the consumer electronic device or through a network coupled to the consumer electronic device.

6. The method of claim 1, wherein the cursor-selectable graphic elements for transport controls are overlaid on the video presentation when the video presentation is in the playback state.

7. The method of claim 1, wherein the first user interface and the second user interface are outputted for display to a display device, and the display device is integrated with the consumer electronic device.

8. A computer-implemented method for controlling a consumer electronic device, the method comprising:
receiving a signal from a remote controller that is configured to control the consumer electronic device, wherein the signal is generated in response to a user gesture that is applied to a touchpad of the remote controller;
determining an operational context based on content currently being outputted for display on a display device by the consumer electronic device;
selecting a context-specific user interface from a plurality of user interface types based on the operational context, wherein each of the plurality of user interface types have a unique visual appearance relative to each other; and
in response to the signal received from the remote controller, outputting for display to the display device:
the context-specific user interface, and
a cursor overlaid on the context-specific user interface and having a position that is controlled by the signal received from the remote controller;
wherein the context-specific user interface comprises: a timeline bar configured to control playback of digital audio and video content of a video media item, and a parallel timeline bar that corresponds to an alternative video content for a specified time region of the video media item, wherein the parallel timeline bar is depicted as branching from the time line bar at the beginning of the specified time region and rejoining the timeline bar at the end of the specified time region, wherein a selection of the parallel timeline bar causes the consumer electronic device to output for display on the display device the alternative video content.

9. A non-transitory computer-readable storage medium storing instructions that, when executed by a processor, cause a computer system to control a consumer electronic device, by performing the steps of:
receiving a first touchpad gesture from a remote controller that is configured to control the consumer electronic device;
determining whether a video presentation being outputted for display by the consumer electronic device is in an idle state or a playback state;
in response to the first touchpad gesture:
outputting for display a first user interface when the video presentation is in the idle state; and
outputting for display a second user interface when the video presentation is in the playback state,
wherein the first user interface includes cursor-selectable graphic elements for setup controls for the consumer electronic device, and the second user interface includes cursor-selectable graphic elements for transport controls for playback of the video presentation;
outputting for display a cursor overlaid on the first user interface or the second user interface and having a position that is controllable by the remote controller; and
executing a command associated with a cursor-selectable graphic element included in the first user interface or the second user interface based on the position of the cursor;
wherein the cursor-selectable graphic elements for setup controls are overlaid on the video presentation when the video presentation is in the idle state, and the cursor-selectable graphic elements for transport controls are overlaid on the video presentation when the video presentation is in the playback state.

10. The computer-readable storage medium of claim 9, wherein the remote controller controls playback of the video presentation by specifying the position of the cursor at a timepoint along a timeline bar.

11. The computer-readable storage medium of claim 9, further comprising the steps of:
determining that an inactivity timer has expired; and
discontinuing outputting the cursor and the first user interface or the second user interface for display.

12. The computer-readable storage medium of claim 9, wherein the cursor-selectable graphic elements include navigation controls for digital content stored on the consumer electronic device or through a network coupled to the consumer electronic device.

13. The computer-readable storage medium of claim 9, wherein the cursor-selectable graphic elements include selection controls for digital content stored on the consumer electronic device or through a network coupled to the consumer electronic device.

14. A non-transitory computer-readable storage medium storing instructions that, when executed by a processor, cause a computer system to control a consumer electronic device, by performing the steps of:
receiving a signal from a remote controller that is configured to control the consumer electronic device, wherein the signal is generated in response to a user gesture that is applied to a touchpad of the remote controller;
determining an operational context based on content currently being outputted for display on a display device by the consumer electronic device;
selecting a context-specific user interface from a plurality of user interface types based on the operational context, wherein each of the plurality of user interface types have a unique visual appearance relative to each other; and
in response to the signal received from the remote controller, outputting for display to the display device:
the context-specific user interface, and
a cursor overlaid on the context-specific user interface and having a position that is controlled by the signal received from the remote controller,
wherein the context-specific user interface comprises: a timeline bar configured to control playback of digital audio and video content of a video media item, and a parallel timeline bar that corresponds to an alternative video content for a specified time region of the video media item, wherein the parallel timeline bar is depicted as branching from the time line bar at the beginning of the specified time region and rejoining the timeline bar at the end of the specified time region, wherein a selection of the parallel timeline bar causes the consumer electronic device to output for display on the display device the alternative video content.

15. A system for controlling a consumer electronic device, the system comprising:
- a remote controller that is configured to control the consumer electronic device, wherein one or more signals are generated in response to a first touchpad gesture that is applied to a touchpad of the remote controller; and
- a processor that receives the one or more signals from the remote controller and is configured to:
    - determine whether a video presentation being outputted for display by the consumer electronic device is in an idle state or a playback state;
    - in response to the first touchpad gesture:
        - output for display a first user interface when the video presentation is in the idle state; and
        - output for display a second user interface when the video presentation is in the playback state,
    - wherein the first user interface includes cursor-selectable graphic elements for setup controls for the consumer electronic device, and the second user interface includes cursor-selectable graphic elements for transport controls for playback of the video presentation
    - output for display a cursor overlaid on the first user interface or the second user interface and having a position that is controllable by the remote controller, and
    - execute a command associated with a cursor-selectable graphic element included in the first user interface or the second user interface based on the position of the cursor;
- wherein the cursor-selectable graphic elements for setup controls are overlaid on the video presentation when the video presentation is in the idle state, and the cursor-selectable graphic elements for transport controls are overlaid on the video presentation when the video presentation is in the playback state.

* * * * *